Sept. 26, 1961
C. LETSON
3,001,410
OSCILLATING FEED CONTROL FOR MILKING PARLOR STALLS
Filed July 28, 1958
4 Sheets-Sheet 1
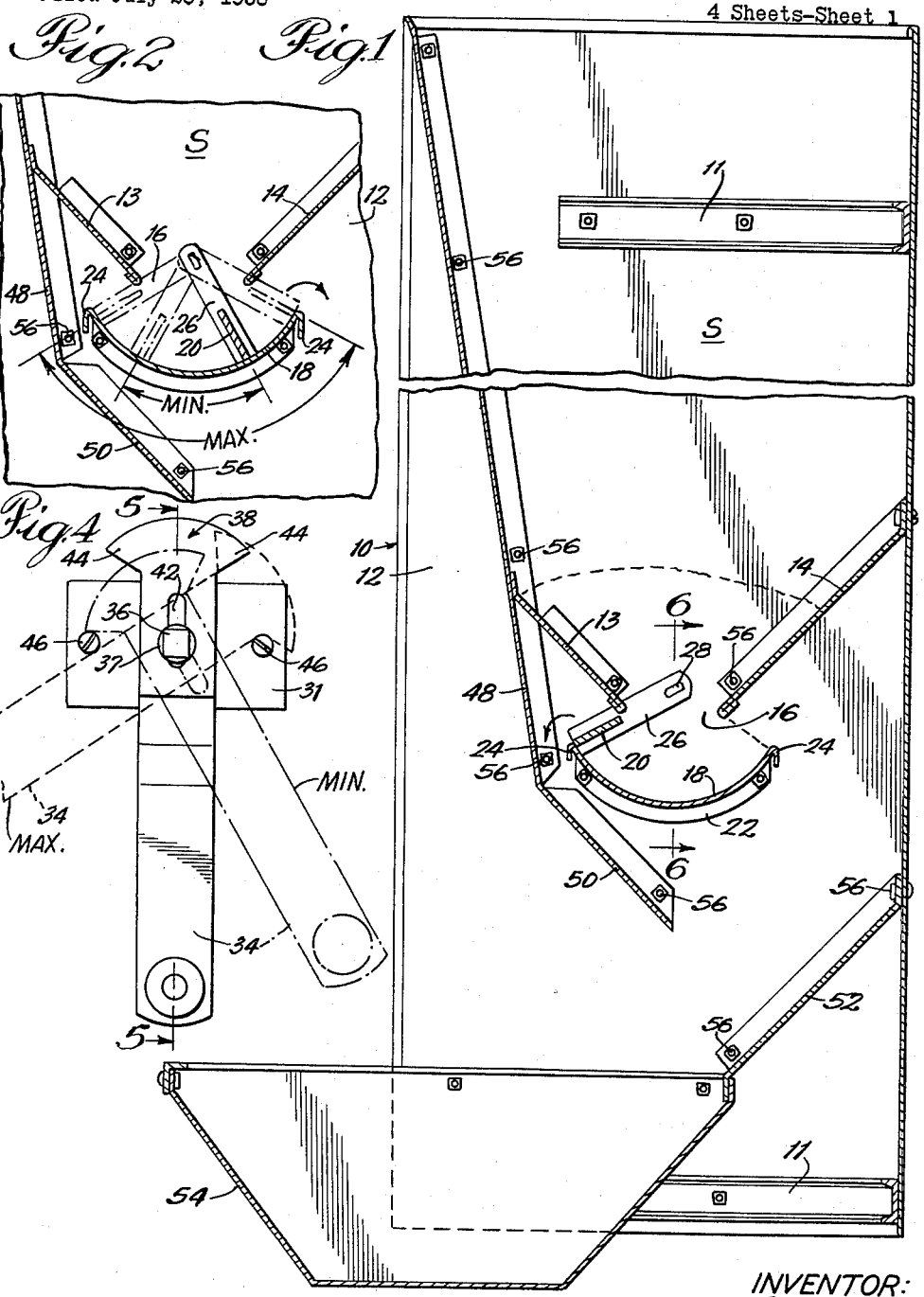
INVENTOR:
Clarence Letson,
BY Bair, Freeman & Molinare
ATTORNEYS.

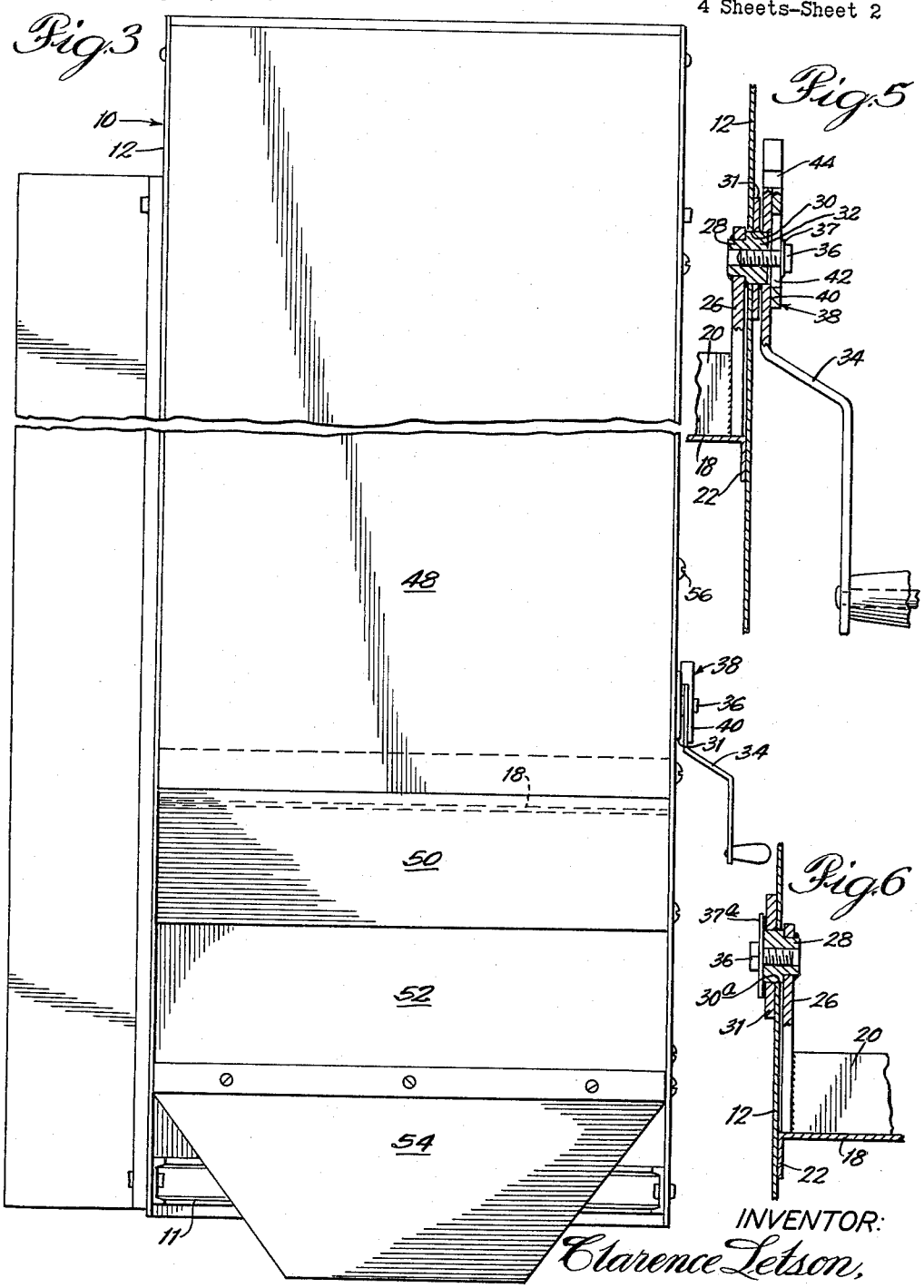

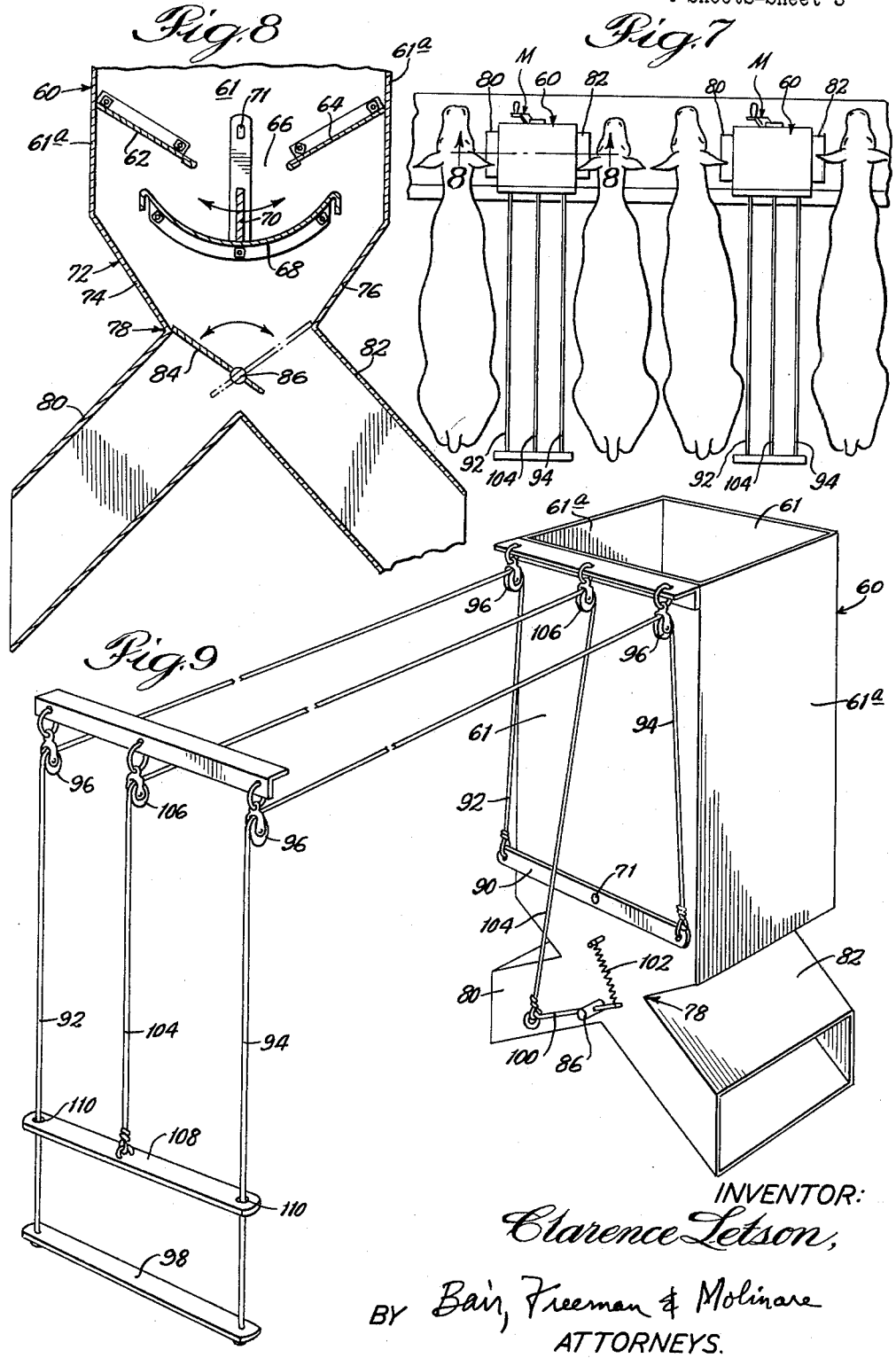

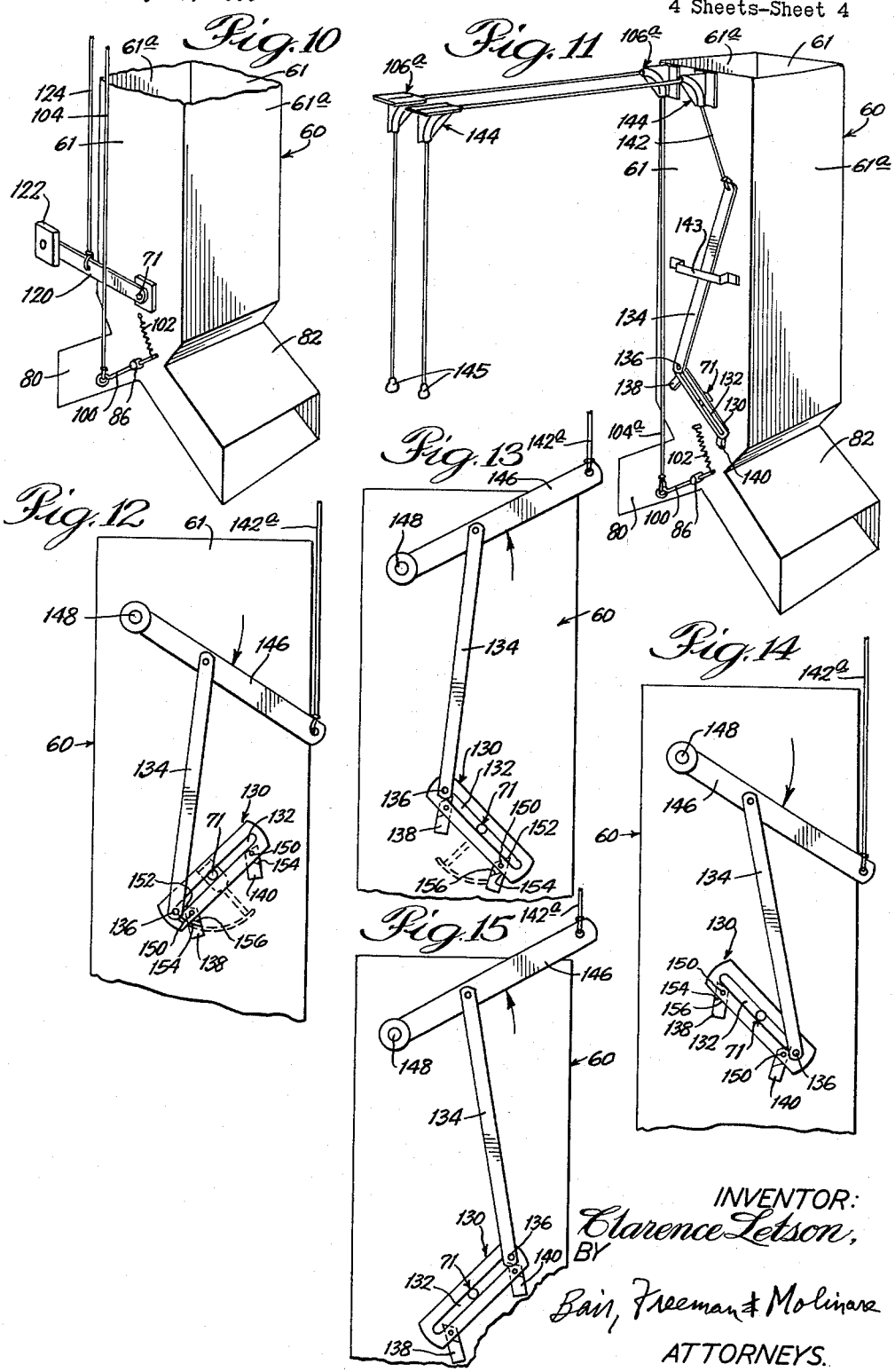

United States Patent Office 3,001,410
Patented Sept. 26, 1961

3,001,410
OSCILLATING FEED CONTROL FOR MILKING PARLOR STALLS
Clarence Letson, Cedar Falls, Iowa, assignor to Clay Equipment Corporation, Cedar Falls, Iowa, a corporation of Iowa
Filed July 28, 1958, Ser. No. 751,298
2 Claims. (Cl. 74—96)

This invention relates to an improved feed control for use in discharging predetermined, metered amounts of feed from a feed storage hopper.

Prior attempts have been made to provide means for delivering predetermined, metered, amounts of feed from a feed hopper to a feed bowl. One type of installation where such a device is highly useful is in milking parlors, where it is common practice to deliver feed to the cow at the time that it is being milked. It is highly desirable that the amount of feed so delivered be regulated, as too little feed would not satisfy the animal, and too much feed would result in eventual overflowing of the feed bowl and in waste. Considering the number of animals that are serviced per hour in a milking parlor, it is practically physically impossible for an attendant to check the amount of feed being delivered to all the animals being milked. Hence, it desirable that the dispensing of feed be as automatic as possible.

Certain prior devices have utilized a paddle-wheel type feed dispenser at the lower end of a feed hopper, which operates to receive feed into the upper chambers of the paddle-wheel and discharge the feed by gravity from the lower chambers, as the paddle wheel is rotated. There exist a number of deficiencies with this prior system. For one, depending on the coarseness of the feed, the amount delivered to each chamber of the paddle wheel varies. Furthermore, the V-shaped chamber opening between paddles is often so narrow that it is difficult to fill completely, as the wheel is rotated. Furthermore, it is difficult to vary the amount of feed being discharged, as the variation available involves multiples of a single chamber's capacity.

Thus, one object of this invention is to provide an improved feed discharge means for delivering therefrom metered amounts of feed.

Another object of this invention is to provide a metered feed-delivery device which is characterized by its simplicity of construction and efficiency and accuracy of operation.

A further object of this invention is to provide a metered feed-delivery means which may be selectively varied continuously over a feed-delivery range, thereby providing for more accurate dispensing of feed from the device.

Another problem incident to feeding of animals in milking parlors involves the physical layout of such parlors, in that the feed must be delivered to the animal adjacent its head, while the milking activities generally require the attendant to be located adjacent the rear end of the animal. Furthermore, as is often the case, a pair of animals are often arranged in a milking parlor in side-by-side relation. Thus, a most efficient system would be one where but a single feed metering means is used selectively to service a pair of cows, and where remote control means were provided to permit selective operation of the feed dispensing means from adjacent the rear ends of the animals.

Thus, still a further object of this invention is to provide a system for servicing two cows with a single feed dispensing means.

And still another object of this invention is to provide remote control means for selectively manipulating the feed delivery means of this invention.

Still another problem incident to the remote control feeding of animals lies in the necessity of providing a simple and flexible feed dispensing system which utilizes a reciprocating feed discharge system. Heretofore, systems for remote control of reciprocal movement actuators have utilized spring means or simple gravity means, or motor control means for operating an actuator or a discharge gate to its initial position after it has been remotely actuated in one direction. All such systems have certain deficiencies which it is the additional purpose of this invention to obviate by providing a novel and simple control for a reciprocating actuator which operates to give positive selective operation of said actuator, successively, in reciprocal directions.

And still a further object of this invention is to provide an articulated control for a reciprocating actuator, wherein the articulated control responds automatically to its positional disposition at the end of each movement of the actuator in one direction, to rearrange the control so as to prepare itself to effect positive movement of the actuator in the opposite direction.

Further objects and advantages of this invention will become apparent as the following description proceeds, and the features of novelty which characterize this invention will be pointed out with particularity in the claims annexed to and forming part of this specification.

A preferred embodiment of the invention is shown in the accompanying drawing, in which:

FIGURE 1 is a side cross-section view of the feed-dispensing means of this invention, showing the feed-dispensing paddle at one end of its range of swing.

FIGURE 2 is a fragmentary view of a portion of FIGURE 1 showing the feed dispensing paddle at the opposite end of its range of swing.

FIGURE 3 is an elevation view taken looking from the left of FIGURE 1.

FIGURE 4 is an enlarged detail elevation view of the handle control for the feed-discharge paddle.

FIGURE 5 is a cross-section view taken on line 5—5 of FIGURE 4 showing the details of mounting of the handle end of the paddle on the hopper structure.

FIGURE 6 is a cross-section view taken on line 6—6 of FIGURE 1 and shows the details of mounting of the other end of the paddle on the hopper structure.

FIGURE 7 is a fragmentary plan view of one type of a cow parlor layout wherein a modified form of this invention may be installed.

FIGURE 8 is a fragmentary cross-section view of the modified form of this invention and is taken on line 8—8 of FIGURE 7.

FIGURE 9 is a perspective view of the modified form of invention shown in FIGURES 7 and 8 and illustrating the remote control for the feed-dispenser means there shown.

FIGURE 10 is a fragmentary view similar to a portion of FIGURE 9 and illustrates another modified form of remote control for a feed dispenser for use with a system of the type shown in FIGURES 7 to 9.

FIGURE 11 is a perspective view similar to FIGURE 9 and illustrates still another modified form of remote control for a feed dispenser for use with a feeding system of the type shown in FIGURES 7 to 9.

FIGURE 12 is a side elevation detail view showing a modified form of the type of control shown in FIGURE 11 and further shows the parts of the control in one extreme position prior to operation of the acuator in one direction.

FIGURE 13 is a view similar to FIGURE 12 showing the control of FIGURE 12 in an intermediate position, at the end of the stroke of the actuator in moving from the position of FIGURE 12.

FIGURE 14 is a view similar to FIGURES 12 and 13 and shows the control in its other extreme position, after the control linkage has rearranged itself from the position of FIGURE 13, and prior to operation of the actuator in the other direction.

FIGURE 15 is similar to FIGURE 13 but shows the relative position of the parts of the control at the end of the movement of the actuator from the position of FIGURE 14.

Referring now to the drawings, there is shown in the figures a storage hopper for cattle feed generally indicated at 10, having upright walls of sheet metal that may be appropriately rigidified by U-shaped channel frame means, such as those shown generally at 11 adjacent the top and bottom of the sheet metal hopper. The storage hopper 10 includes two upright, spaced, end walls 12 and other upright walls transverse to the end walls 12 and cooperating to define a feed receiving space S, and providing downwardly and inwardly inclined transverse wall portions 13 and 14. The lower edges of transverse walls 13 and 14 are spaced apart to define a bottom opening 16 in the supply hopper which extends along the width of hopper space S between the end walls 12. The arrangement is such that feed which is stored in the upper portion of hopper 10 continually passes by force of gravity through the bottom opening 16.

Positioned directly below the bottom hopper opening 16 and spaced therefrom, within the hopper 10, is a support wall 18 which extends transversely between the end walls 12 coextensive with opening 16, and which is of a length, transverse to the spacing of end walls 12, greater than the width of the hopper opening 16. The said length of the support wall 18 is selected relative to the width of the hopper opening 16 and to the spacing of the support wall 18 below the hopper opening 16 such that the feed passing downwardly through the hopper opening 16 will be supported on said support wall at its angle of repose and will not spill over the ends of the support wall.

A discharge paddle 20 is positioned in the space between the bottom opening 16 of the hopper means and the upper surface of the support wall 18. The discharge paddle 20 is adapted to be oscillated over the upper surfacee of the support wall 18, and substantially between the ends of the said support wall 18, to effect discharge of feed over the edges of the support wall 18, depending upon the direction of stroke of the discharge paddle. While the support wall 18 could be generally planar in form, and the discharge paddle 20 could be oscillated substantially horizontally between its two extreme positions, more specifically the support wall 18 is shown to be in the form of a segment, or arc, of a circle and the arcuate length of the arcuate support wall 18 is, of course, selected as pointed out hereinabove, so that the angle of repose of the feed being fed by gravity from the hopper means will not effect spillage of feed over the edges of the arcuate support wall. The support wall 18 is mounted between the end walls 12 by means of downwardly extending flanges 22 on wall 18 which are secured to the end walls 12. The edges 24 of the support wall 18 are turned over and downwardly to provide a smooth edge over which the feed is to be discharged by the discharge paddle 20. It will readily be understood that when paddle 20 sweeps in one direction it forces feed ahead of it over one edge of wall 18, while more feed passes downwardly through opening 16 and fills in behind paddle 20, resting on wall 18.

The discharge paddle 20 is elongated and is of substantially the same axial length as the arcuate support wall 18. The ends of the discharge paddle 20 are appropriately secured, such as by welding or the like, to a pair of radial extending arms 26 which are keyed or welded onto studs 28 that are positioned inwardly of the hopper and walls 12. The studs 28 are carried by bearings 30 and 30a which, in turn, are appropriately pivotally supported in opposed apertures formed in the end walls 12. The bearings 30 and 30a carry bearing washers 31 for engagement with the outer sides of walls 12 to properly position the bearings in the walls. The axis of bearings 30—30a coincide with the center of curvature of arcuate support wall 18.

One of the bearings, 30, seen in FIGURE 5, has an outwardly extending non-circular portion 32 to which an elongated actuating handle 34 is keyed, so as to effect a driving connection between handle 34 and the discharge paddle 20. The bearing 30 is centrally threaded and carries therein a threaded clamping bolt 36. A stop head generally indicated at 38 is provided in association with the handle 34, and is clamped in position through washer 37 under the head of bolt 36. The other bearing, 30a, seen in FIGURE 6, may be connected to an actuator as is disclosed in certain modified forms hereinafter, but as shown in FIGURE 6, the bearing 30a is centrally threaded to carry a threaded clamping bolt 36a whose head engages washer 37a for retention of washer 31.

The stop head 38 has a shank portion 40 having an elongated slot 42 therein, and the stop head also has a pair of outwardly extending ears 44, as best seen in FIGURE 4. The stop head is arranged to cooperate with a pair of stop studs 46 that are carried on the hopper 10 and which extend outwardly of the end wall 12 adjacent which the handle 34 is located. The stop studs 46 are positioned to be engaged by a portion of the stop head 38, to define limits of the pivoting of the handle 34, and of the discharge paddle 20 connected thereto, about the longitudinal axis of the bearing means 30—30a. The stop head 38 is adjustable relative to the handle 34 and radially of the threaded bolt 36 which serves to clamp said head 38 in its selected positions. By radially adjusting the stop head 38 relative to the shank of bolt 36, the range of movement of the handle 34, and of the discharge paddle 20, may be varied, so as to effect a discharge of a variable amount of feed off the ends of support wall 18, for each swing of the handle 34 in one or the other of the opposite directions in which the handle is arranged to swing.

The stop head 38 may be adjusted to provide the specific amount of weight of feed that is desired, and the stop head may be appropriately calibrated as to its radial position relative to the clamping bolt 36, in terms of pounds of feed to be discharged upon each stroke or swing of the handle 34. FIGURE 4 illustrates in dash lines the maximum range of the swing of the handle 34, depending upon the position of the stop head 38, and FIGURE 4 also illustrates, in dot-and-dash lines, the minimum range of swing of the handle 34 and of the associated discharge paddle 20. FIGURE 1 illustrates the discharge paddle 20 at one end of its maximum swing, and the adjacent arrow indicates the direction of movement of feed being discharged. FIGURE 2 illustrates the discharge paddle at the opposite end of its minimum swing with the adjacent arrow indicating the direction of movement of feed discharge.

Positioned below the discharge edges of the support plate 18, there are provided inclined wall means for directing the feed that is discharged by the paddle 20. As shown in FIGURE 1, there is a first inclined wall 48 positioned in relatively close, spaced relation to the left-hand edge of support wall 18, and there is an inwardly inclined extension wall 50 which projects under and inwardly of the support wall 18 substantially to a point below the axis of pivoting of the discharge paddle 20. A second inclined wall 52 is provided, spaced below the lower terminus of wall 50 and also spaced below the right-hand discharge edge of support wall 18.

The arrangement is such as to provide a series of stepped, vertically spaced walls which ultimately cause all the feed that is discharged over the left or right hand edges of the support wall 18 to be directed into a hopper-like feeding bowl generally indicated at 54. The arrangement of the hopper-like bowl 54, together with the inwardly inclined walls 48 and 50, provides an enlarged recess, which is best seen in FIGURE 1, into which an animal's head may be introduced so that the animal will have access to the feed carried by the hopper-like feeding bowl 54.

The entire arrangement disclosed in FIGURES 1 to 3 may be formed of sheet metal parts and the various transverse walls, such as walls 13, 14, 48, 50 and 52, extending between the spaced end walls 12 are provided with flanges for attachment to the inner sides of end walls 12, and the flanges may be rigidly secured to the end walls 12 by means of assembly bolt means 56, thereby providing a substantially rigid structure.

It will be seen that the effective height of the paddle 20 is just slightly less than the spacing between the lower terminus of the inclined walls 13 and 14 and the upper surface of the support wall 18, so that there is sufficient clearance between said parts to permit oscillation of the paddle 20 in the space defined between the support wall 18 and the lower terminus of the hopper means surrounding opening 16. At the same time, there should be as little clearance as necessary so that there is no spillage of feed over the upper edge of the paddle 20 and outwardly of the support wall 18.

The inclined side walls 13 and 14 which are adjacent the bottom opening 16 in the hopper are disposed at an angle to the horizontal which is steeper than the normal angle of repose of the feed which is stored within the hopper, thereby preventing bridging over of the hopper opening 16 and insuring continuous flow by gravity of the feed through the hopper opening 16.

The first modified form to which the invention hereinabove described lends itself is in a system shown in FIGURES 7 and 8, wherein the cows being milked are aligned as seen in FIGURE 7 so that there is a single feed hopper positioned between pairs of adjacent animals. In the plan view of FIGURE 7, there are shown four animals and only two feed hoppers 60 positioned between pairs of animals. More specifically in FIGURE 8, the feed hopper 60 is shown as including a pair of spaced, upright, end walls 61, a pair of upright, transverse walls 61a, and a pair of inclined walls 62 and 64 which are spaced apart at their lower ends to define the hopper opening 66 through which feed passes. A support wall 68 is spaced below the hopper opening 66 to receive feed thereon; and a discharge paddle 70 is positioned for arcuate swinging about the axis of pivot, or shaft, means generally indicated at 71.

The upright walls 61 of the hopper 60 are extended downwardly below support wall 68 to define a hopper-like receiving means generally indicated at 72, having inwardly and downwardly inclined walls 74 and 76 which converge at a restricted, or constricted, region indicated at 78. Extending downwardly from the constricted region 78 there are provided laterally diverging feed delivery chutes 80 and 82 for delivery of feed to one or the other animals positioned on opposite sides of the hopper 60.

Positioned within the hopper 60 is a feed diverting means which includes a wall member 84 which is connected to a pivot shaft 86 that is journaled in the end walls 61 of the hopper. A manual handle control (not shown) may be provided for the pivot shaft 86 by connecting the handle to a portion of the shaft 86 extending outwardly of the forward wall 61 of the hopper 60, so that the operator of the device may swing the wall 84 from the full line position in FIGURE 8 to the broken line position in FIGURE 8, so as to divert the feed either to the delivery chute 80 or 82, as desired. A selectively variable manual control M for discharge paddle 70, of the type disclosed in FIGURE 1 to 6 hereinabove, may be provided adjacent the forward wall 61 of hopper 60 so that the manual controls for both paddle 70 and diverter wall 84 will be located adjacent each other for the convenience of the milking station attendant.

FIGURE 9 illustrates one form of remote control for the construction which is disclosed in FIGURE 8. Very frequently, the milking station attendant is located in an area adjacent the rear of the animals being milked and does not have easy access to the front side of the feed hopper 60. Accordingly, it becomes desirable to provide remote control means for actuating the mechanisms disclosed in FIGURE 8 so as to effect delivery of feed to the animals being milked.

The remote control for the discharge paddle 70 includes an elongated control bar, or lever, 90, which is operatively connected to a portion of the shaft means 71 which extends outwardly of the rear wall 61 of the hopper 60. The elongated control bar 90 is for the purpose of effecting oscillation of the paddle 70, to effect discharge of feed over one or the other ends of the support wall 68. First and second means are connected to first and second portions of the control bar 90 for effecting movement of the paddle in opposite directions. These means consist principally of cables 92 and 94 which are connected to opposite ends of the control bar 90 and which are each trained over a plurality of cable guides, or pulleys, 96, that are appropriately supported by structure in the milking house, and which cables connect at their ends to a manual control bar 98. By pulling on either the cable 92 or 94, or by manipulation of the control bar 98, the discharge paddle 70 may be actuated in selected opposite directions.

The diverter wall 84 shown in FIGURE 8 is, in the embodiment of FIGURE 9, biased towards one of its operative positions, by means of a lever arm 100 which connects to shaft 86, and by a spring 102 which connects to the lever arm 100 at one end thereof and is anchored at its other end to the hopper 60. In order to swing the diverter wall 84 from the spring biased position to the opposite position, there is provided a cable 104 connected at one end to lever arm 100 and which passes over cable guides, or pulleys, 106 and terminates in a control bar 108 positioned adjacent the other control bar 98. For the purposes of maintaining alignment between the control bars, the control bar 108 is provided with bores 110 through which the cables 92 and 94 pass.

The foregoing arrangement provides a first remote control for actuating discharge paddle 70 and a second remote control adjacent the first control for selectively diverting feed either to chute 80 or 82, as desired.

In the modified form of FIGURE 10, the means for effecting movement of the discharge paddle 70 is slightly varied. There is provided a lever means 120 which is operatively connected to the shaft means 71, about which the discharge paddle 70 is adapted to oscillate. The extended end of lever means 120 carries a weight 122 of selected size and operates to normally swing the discharge paddle 70 toward one extreme position. To effect movement of the discharge paddle to the other extreme position, there is provided an actuating cable 124 which passes over appropriate rope guides, or cable guides, to a position adjacent the end of the actuating cable 104 for the diverter wall 84.

In the form of the remote control means shown in FIGURES 11 to 15, the means for actuating the discharge paddle 70 is again modified. Here, the shaft means 71, which is operatively connected with the discharge paddle 70, is provided with an operative connection to an elongated lever 130. The elongated lever 130 has a longitudinal traverse thereon in the form of an elongated slot 132. The arrangement of lever 130 relative to discharge paddle 70 is such that at the extreme positions of discharge paddle 70, the lever 130 is arranged in a pair of upright, inclined, operative positions which are disposed transverse to each other. One of such positions is shown in FIGURES 11. There is provided a second member, or traveling member, 134 for connection to elongated member 130 and having a traverse-engaging portion in the form of pin 136, positioned in slot 132, which pin is adapted for sliding movement along slot 132.

The elongated member 130 carries thereon a pair of dog means 138 and 140 which are located adjacent the ends of the traverse 132. The dog means are arranged so that when the elongated member 130 is in either of its pair of inclined, operative, positions, one of the dog means is at a high position and the other dog means is at a low position. As seen in FIGURE 11, dog means 138 is at high position, and dog means 140 is at low position. Furthermore, when the dog means is in high position it is inoperative to retentively engage the pin 136 in the up position, and hence the traveling member 134 and pin 136 are permitted to slide downwardly in the traverse 132 from one end thereof to the other end, while the dog means in the low position is of a nature to operatively engage, and lock with, the pin 136 located in the traverse 132.

The member 134 is an elongated bar that is connected at its upper end to an actuating cable 142 which is trained over suitable cable guides 144 to terminate in a grip 145 adjacent the grip for cable 104a that is provided for actuating discharge paddle 70. The cable 104a is trained over cable guides 106a to a convenient location. A retainer bar 143 carried on the rear wall 61 of hopper 60 cooperates with said wall 61 to provide a slot therebetween in which bar 134 may operate without becoming displaced from the necessary and desired planar alignment thereof with member 130.

FIGURES 12 and 15 show a different operative connection for member 134 seen in FIGURE 11 and also illustrate the operation of the device shown in FIGURE 11. In FIGURES 12 and 15, the elongated member 134 is pivotally connected at its upper end to a lever 146. The lever 146 is pivotally mounted at 148 on the rear wall 61 of hopper 60. A cable 142a connected to lever 146 provides for actuation of the control. The pivotal connection of member 134 to lever 146 operates to maintain desired planar alignment of member 134 with member 130 and also operates to provide a mechanical advantage for actuating cable 142a.

The arrangement in FIGURE 11 and in FIGURES 12 to 15 is such that when the low dog 138 (in FIGURE 12) engages the pin 136, a pull on the cable 142a swings the elongated lever 130 from the position of FIGURE 12 to the position of FIGURE 13. When the cable 142a is released, the dog 138 having swung to an inoperative position and pin 136 having been released by dog 138, the weight of the member 134 operates to effect sliding movement of pin 136 downwardly along the inclined traverse 132 to the lower end position where it is locked into operative engagement with the low dog 140 (in FIGURE 14). Then, when the cable 142a is again actuated, this operates to move the elongated lever 130 from the position of FIGURE 14 to the position of FIGURE 15 and, now, the high dog 140 swings out of the position of operative engagement with pin 136, and when the cable 142a is released the weight of member 134 causes member pin 136 to move to the position shown in FIGURE 12, and the cycle is completed.

The figures further illustrate the detail of the dog means which are operative to effect latching and unlatching as elongated lever 130 is swung to its opposite inclined positions. Each of the dogs is pivotally mounted on pins 150 on the lower side of elongated lever 130 below the elongated traverse 132. One portion of each dog has a tooth 152 for engaging a portion of pin 136 to effect the locking connection. The shoulder 154 engages an edge of lever 130 to prevent movement of the dog away from locking position. When the dog is in the high position, the steeply cut wall 156 permits the swinging of the tooth 152 away from locking position with pin 136 and effects the release of that member. It will be seen that only the force of gravity acting on the mass of the dog is necessary to effect pivoting of the dog from latching to unlatching position and vice versa depending on the attitude of lever 130.

Thus, and it will be seen from the foregoing, there has been provided a novel type feed dispenser having a feed dispenser which is arranged to dispense feed when it is moved in either of a pair of opposite directions, and there is also provided means associated therewith for varying, over a continuous range, the amount of feed being dispensed by a single actuation of the feed dispenser, so that a milking house attendant may selectively adjust the feed dispenser to dispense the proper amount of feed to an animal being milked. Furthermore, there has been provided means both for remotely controlling the operation of such a feed dispenser and means for selectively directing the feed through a pair of chutes to one of the other of a pair of animals between which a feed hopper is positioned. With respect to the remote control of the feed dispenser, there has been provided a novel mechanical system for resetting the operative portions of the remote control actuator, so that each actuation of the means provides for positive movement of the feed dispenser, thereby closely simulating, with a simple remote control means, the actual manual control of the feed dispenser.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States is:

1. A remote control for a device which is arranged to be selectively moved in a pair of opposite directions, said remote control comprising first and second connected members, one of said members being elongated, the second member being a traveling member, means defining a traverse along said elongated member over which said second member is adapted to travel, the elongated member having a pair of operative positions which are located transverse to each other, said elongated member having means adjacent each end of the traverse arranged for engagement with the traveling member, the said pair of means on said elongated member being arranged so that, when the elongated member is in one position of its pair of operative positions, one of said means is effective to operatively engage the traveling member while the second of said means is in condition to release said traveling member, and when the elongated member is in its second operative position, then the one means is in condition to release said traveling member and the second said means is effective to operatively engage said traveling member, means including the traveling member being operatively engaged by one means of said pair of means to effect selective movement of said elongated member between the pair of operative positions, and said traveling member being released by an engaging means and being movable along said traverse from one end thereof to the other, to be operatively engaged by the other engaging means, after the elongated member has been moved from one of the pair of its operative positions to the other of said pair of positions.

2. A remote control for a device which is arranged to be selectively moved in a pair of opposite directions, said remote control comprising an elongated member connected to the device, for driving said device, said elongated member having a longitudinal traverse thereon, said elongated member having a pair of upwardly inclined, operative positions, which are transverse to each other, a second member having a traverse-engaging portion adapted for movement along said traverse, dog means on said elongated member adjacent the ends of said traverse so that when the elongated member is in either of its operative positions one of said dog means is at a high position and the other dog means is at a low position, each dog means being arranged relative to the traverse so that when the dog means is in high position it is inoperative and when the dog means is in low position it is operative to engage the traverse-engaging portion of said second member to effect an operative connection between the second member and the elongated member, means for effecting movement of said traverse-engaging portion of the second member from high position to low position, and means connected to said second member of effect selective movement of said elongated member between its pair of operative positions while simultaneously reversing the high and low positions of the pair of dog means.

References Cited in the file of this patent

UNITED STATES PATENTS

| | | |
|---|---|---|
| 414,725 | Rose | Nov. 12, 1889 |
| 879,423 | Sturtevant | Feb. 18, 1908 |
| 1,552,083 | Riley et al. | Sept. 1, 1925 |
| 1,607,892 | Hunt | Nov. 23, 1926 |
| 1,778,588 | Ebersole | Oct. 14, 1930 |
| 1,976,650 | Beckner et al. | Oct. 9, 1934 |
| 2,204,097 | Montgomery | June 11, 1940 |
| 2,620,946 | Auer | Dec. 9, 1952 |
| 2,675,947 | Wynn | Apr. 20, 1954 |